US012734517B2

(12) United States Patent
Takada et al.

(10) Patent No.: US 12,734,517 B2
(45) Date of Patent: Sep. 15, 2026

(54) DRY ION EXCHANGE RESIN MANUFACTURING METHOD AND MANUFACTURING DEVICE, AND TREATMENT TARGET LIQUID PURIFYING METHOD AND PURIFYING DEVICE

(71) Applicant: ORGANO CORPORATION, Tokyo (JP)

(72) Inventors: Noriko Takada, Tokyo (JP); Kaoru Nukui, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 490 days.

(21) Appl. No.: 18/284,351

(22) PCT Filed: Jan. 27, 2022

(86) PCT No.: PCT/JP2022/003045

§ 371 (c)(1),
(2) Date: Sep. 27, 2023

(87) PCT Pub. No.: WO2022/209233

PCT Pub. Date: Oct. 6, 2022

(65) Prior Publication Data

US 2024/0157354 A1 May 16, 2024

(30) Foreign Application Priority Data

Mar. 31, 2021 (JP) ................................ 2021-060715

(51) Int. Cl.

*B01J 39/05* (2017.01)
*B01J 39/07* (2017.01)
*B01J 45/00* (2006.01)
*B01J 47/016* (2017.01)

(52) U.S. Cl.

CPC ............. *B01J 47/016* (2017.01); *B01J 39/05* (2017.01); *B01J 39/07* (2017.01); *B01J 45/00* (2013.01)

(58) Field of Classification Search

CPC .......... B01J 47/016; B01J 39/05; B01J 39/07; B01J 45/00; B01J 39/20; B01J 41/07; B01J 49/06; B01J 49/60; Y02E 60/10

See application file for complete search history.

(56) References Cited

U.S. PATENT DOCUMENTS

2003/0150814 A1 8/2003 Bader et al.
2020/0369795 A1 11/2020 Yoshimura et al.
2021/0060528 A1 3/2021 Yaguchi et al.

FOREIGN PATENT DOCUMENTS

CN 101259884 A 9/2008
CN 111699040 A 9/2020
JP 61-171507 A 8/1986
JP 11-171508 A 6/1999
JP 2003-26251 A 1/2003
JP 2003026251 * 1/2003
JP 2004-181352 A 7/2004
JP 2004181351 A * 7/2004
JP 2004249238 A * 9/2004
JP 2007-117781 A 5/2007
JP 2007117781 * 5/2007
JP 2012-81411 A 4/2012
JP 2012081411 * 4/2012
JP 2019-111463 A 7/2019
JP 2019-141800 A 8/2019
JP 2019-188300 A 10/2019
JP 2020-195946 A 12/2020
JP 2021-1124 A 1/2021
WO 2019/131629 A1 7/2019
WO WO-2020069558 A1 * 4/2020 ............ C01D 15/08

OTHER PUBLICATIONS

International Search Report issued Apr. 5, 2023 in International Bureau of WIPO Patent Application No. PCT/JP2022/003045 with an English translation thereof.
Written Opinion issued Apr. 5, 2023 in International Bureau of WIPO Patent Application No. PCT/JP2022/003045 with an English translation thereof.
International Preliminary Report on Patentability issued Oct. 3, 2023 in International Bureau of WIPO Patent Application No. PCT/JP2022/003045. Note: See English translation of Written Opinion for English language translation.
Office Action, dated Sep. 8, 2025 in Chinese family member application No. 202280023720.2 with English language translation thereof.
Office Action, dated Oct. 1, 2025, in Korean family member application No. 10-2023-7037332, with English language translation thereof.
Office Action, dated Dec. 10, 2025, in Chinese family application No. 202280023720.2 with English language translation thereof.
Office Action, dated Oct. 1, 2024, in Japanese family member Patent Application No. 2023-510543 with English language translation thereof.
Office Action, dated Jun. 11, 2025, in Chinese family member application No. 202280023720.2 with English language translation thereof.
"Chinese Disperse Metals", Chinese Metal Industry Association, p. 37, Beijing Metallurgical Industry Press, May 2014. Note: This document is in the Chinese language; however, attention is directed to the English language translation of the Chinese Office Action, p. 5, item 4., for a concise statement of relevance in the English language.

(Continued)

*Primary Examiner* — Kumar R Bhushan
(74) *Attorney, Agent, or Firm* — GREENBLUM & BERNSTEIN, P.L.C.

(57) ABSTRACT

A dry ion exchange resin manufacturing method includes: obtaining a purified cation exchange resin by bringing a cation exchange resin to be purified into contact with a mineral acid solution having a metal impurity content of 1 mg/L, or less and a concentration of 5% by weight or more, to purify the cation exchange resin, wherein a total metal impurity elution amount eluted when hydrochloric acid having a concentration of 3% by weight is passed through the purified cation exchange resin with a volume ratio of 25 times is at most equal to 5 μg/mL-R; and drying step of drying the purified cation exchange resin under reduced pressure at 80° C. or lower until the moisture content is at most equal to 5% by weight.

5 Claims, 5 Drawing Sheets

(56) References Cited

OTHER PUBLICATIONS

Office Action, dated Jul. 21, 2025 in Taiwanese family member Patent Application No. 111111257, with English language translation thereof.

Office Action dated Jan. 28, 2025 in Japanese family member application No. 2023-510543 with English language translation thereof.

* cited by examiner

DRY ION EXCHANGE RESIN MANUFACTURING METHOD AND MANUFACTURING DEVICE, AND TREATMENT TARGET LIQUID PURIFYING METHOD AND PURIFYING DEVICE

TECHNICAL FIELD

The present invention relates to a dry ion exchange resin manufacturing method and manufacturing device, and also to a treatment target liquid purifying method and purifying device that use that dry ion exchange resin.

BACKGROUND

In recent years, purified nonaqueous solvents from which impurities have been removed to a high degree have become increasingly used in semiconductor manufacturing processes and as the electrolyte for lithium ion batteries and the like.

Distillation methods in which impurities are removed by distillation are already well known as purification methods for nonaqueous solvents, but not only are the cost allocations required for the equipment large, and an enormous amount of energy required for the distillation treatment, there are also technical issues such as difficulties in achieving a high degree of purification.

Accordingly, in recent years, methods for purifying nonaqueous solvents by ion exchange methods using an ion exchange resin or an ion exchange filter or the like have been proposed. Ion exchange methods require little cost allocation for the equipment, conserve energy, and are capable of purifying and removing impurities to a high degree.

Approximately 50% of the weight of an ion exchange resin is water, and the moisture eluted from the ion exchange resin during purification of a nonaqueous solvent becomes an impurity within the nonaqueous solvent. Accordingly, in the purification of a nonaqueous solvent using an ion exchange resin, it is necessary to reduce the moisture content of the ion exchange resin prior to the purification process.

One example of a conventional technique used for reducing the moisture eluted from an ion exchange resin prior to solvent purification is a method in which the ion exchange resin is dried to remove moisture, and the nonaqueous liquid and the dried ion exchange resin are then brought into contact, thereby reducing the moisture (see Patent Documents 1 and 2). A technique of drying a strong cationic exchange resin under reduced pressure within a prescribed temperature range has also been reported (see Patent Document 3).

In terms of dry resins, a purification method for a nonaqueous liquid that uses a dry resin for which the moisture content has been reduced to no more than a prescribed value, and which has then been mixed with an ion exchange resin of a different ionic form, and a purification method in which an ion exchange resin is dried while packed inside a cartridge, and is then brought into contact with a nonaqueous liquid have already been reported (see Patent Document 4). A method for purifying a nonaqueous solvent by passing a dehydrating nonaqueous solvent through a packed bed of a granular resin having ion exchange groups that has not undergone dewatering treatment, thereby removing moisture from the granular resin, and then passing the nonaqueous solvent of the purification target through the packed bed of the dewatered granular resin has also been reported (see Patent Document 5). One example of a method that has been reported for bringing a nonaqueous liquid and an ion exchange resin into contact is a method in which the nonaqueous liquid is circulated through a zeolite and the ion exchange resin to reduce the moisture (see Patent Document 6).

In the purification of nonaqueous solvents, and particularly in the purification of hydrolyzable solvents, the use of H-form cation exchange resins having chelating groups of comparatively low acidity or weakly acidic cation exchange groups, rather than the types of strong cation exchange resins typically used for metal removal, is also known (see Patent Document 7). Moreover, purification methods for chelating resins having a low metal content, and methods for purifying nonaqueous liquids using those chelating resins have also been reported (see Patent Documents 8 and 9).

However, there are no reports of cation exchange resins such as chelating resins that have extremely low moisture content as well as low metal content. Although the effects of chelating resins in the purification of nonaqueous liquids are known, in the semiconductor market and the like, where demands for higher purity continue to increase, cation exchange resins such as chelating resins with an even lower moisture content and a higher degree of cleanliness are required.

PATENT LITERATURE

CITATION LIST

Patent Document 1: JP 2004-181351 A
Patent Document 2: JP 2004-181352 A
Patent Document 3: JP 2004-249238 A
Patent Document 4: JP 2019-111463 A
Patent Document 5: JP 2021-001124 A
Patent Document 6: JP 2020-195946 A
Patent Document 7: WO 2019/131629 pamphlet
Patent Document 8: JP 2019-141800 A
Patent Document 9: JP 2019-188300 A

SUMMARY

Technical Problem

Objects of the present invention are to provide a dry ion exchange resin manufacturing method and manufacturing device capable of yielding a dry ion exchange resin having a reduced moisture content and metal content, and also provide a treatment target liquid purifying method and purifying device that use the dry ion exchange resin.

Solution to Problem

The present invention provides a dry ion exchange resin manufacturing method that includes: a purifying step of obtaining a purified cation exchange resin by bringing a cation exchange resin that represents a purification target into contact with a mineral acid solution having a metal impurity content of not more than 1 mg/L and a concentration of at least 5% by weight to purify the cation exchange resin, wherein a total metal impurity elution amount eluted when hydrochloric acid with a concentration of 3% by weight is passed through the purified cation exchange resin with a volume ratio of 25 times is not more than 5 μg/mL-R; and a drying step of drying the purified cation exchange resin under reduced pressure at 80° C. or lower until the moisture content is not more than 5% by weight.

In the dry ion exchange resin manufacturing method described above, the amounts of sodium (Na), calcium (Ca), magnesium (Mg) and iron (Fe) in the mineral acid solution used in the purifying step may each be not more than 200 μg/L.

The dry ion exchange resin manufacturing method described above may also include a mixing step of mixing the dry cation exchange resin obtained in the drying step with an anion exchange resin having a moisture content of not more than 10% by weight.

In the dry ion exchange resin manufacturing method described above, the cation exchange resin may have aminomethylphosphonic acid groups or iminodiacetic acid groups as chelating groups.

The dry ion exchange resin obtained in the dry ion exchange resin manufacturing method described above may be stored in a container in which the interior portion that contacts the dry ion exchange resin is coated with a metal-free material, and for which the 24-hour water vapor permeability is not more than 8 $g/m^2$.

The present invention also provides a dry ion exchange resin manufacturing device comprising a purification unit for obtaining a purified cation exchange resin by bringing a cation exchange resin that represents a purification target into contact with a mineral acid solution having a metal impurity content of not more than 1 mg/L and a concentration of at least 5% by weight to purify the cation exchange resin, wherein a total metal impurity elution amount eluted when hydrochloric acid with a concentration of 3% by weight is passed through the purified cation exchange resin with a volume ratio of 25 times is not more than 5 μg/mL-R; and a drying unit for drying the purified cation exchange resin under reduced pressure at 80° C. or lower until the moisture content is not more than 5% by weight.

In the dry ion exchange resin manufacturing device described above, the drying unit preferably includes a heater installed so as to cover at least a portion of the exterior of a column inside which the purified cation exchange resin is packed, and a pump that reduces the pressure inside the column.

In the dry ion exchange resin manufacturing device described above, the drying unit preferably includes a drying oven that stores and heats the purified cation exchange resin, and a pump that reduces the pressure inside the drying oven.

In the dry ion exchange resin manufacturing device described above, the amounts of sodium (Na), calcium (Ca), magnesium (Mg) and iron (Fe) in the mineral acid solution used in the purification unit may each be not more than 200 μg/L.

The dry ion exchange resin manufacturing device described above may also comprise a mixing unit for mixing the dry cation exchange resin obtained in the drying unit with an anion exchange resin having a moisture content of not more than 10% by weight.

In the dry ion exchange resin manufacturing device described above, the cation exchange resin may have aminomethylphosphonic acid groups or iminodiacetic acid groups as chelating groups.

In the dry ion exchange resin manufacturing device described above, the dry ion exchange resin obtained in the dry ion exchange resin manufacturing device may be stored in a container in which the interior portion that contacts the dry ion exchange resin is coated with a metal-free material, and for which the 24-hour water vapor permeability is not more than 8 $g/m^2$.

The present invention also provides a treatment target liquid purifying method for purifying a treatment target liquid having ionic impurities and a moisture concentration of not more than 1% by weight using the dry ion exchange resin obtained in the dry ion exchange resin manufacturing method described above.

In the treatment target liquid purifying method described above, the treatment target liquid may be a hydrolyzable solvent.

The present invention also provides a treatment target liquid purifying device containing a treatment target liquid purifying unit for purifying a treatment target liquid having ionic impurities and a moisture concentration of not more than 1% by weight using the dry ion exchange resin obtained in the dry ion exchange resin manufacturing device described above.

In the treatment target liquid purifying device described above, the treatment target liquid may be a hydrolyzable solvent.

Advantageous Effects of Invention

The present invention is able to provide a dry ion exchange resin manufacturing method and manufacturing device capable of yielding a dry ion exchange resin having a reduced moisture content and metal content, as well as a treatment target liquid purifying method and purifying device that use the dry ion exchange resin.

DESCRIPTION OF EMBODIMENTS

Figure 1:
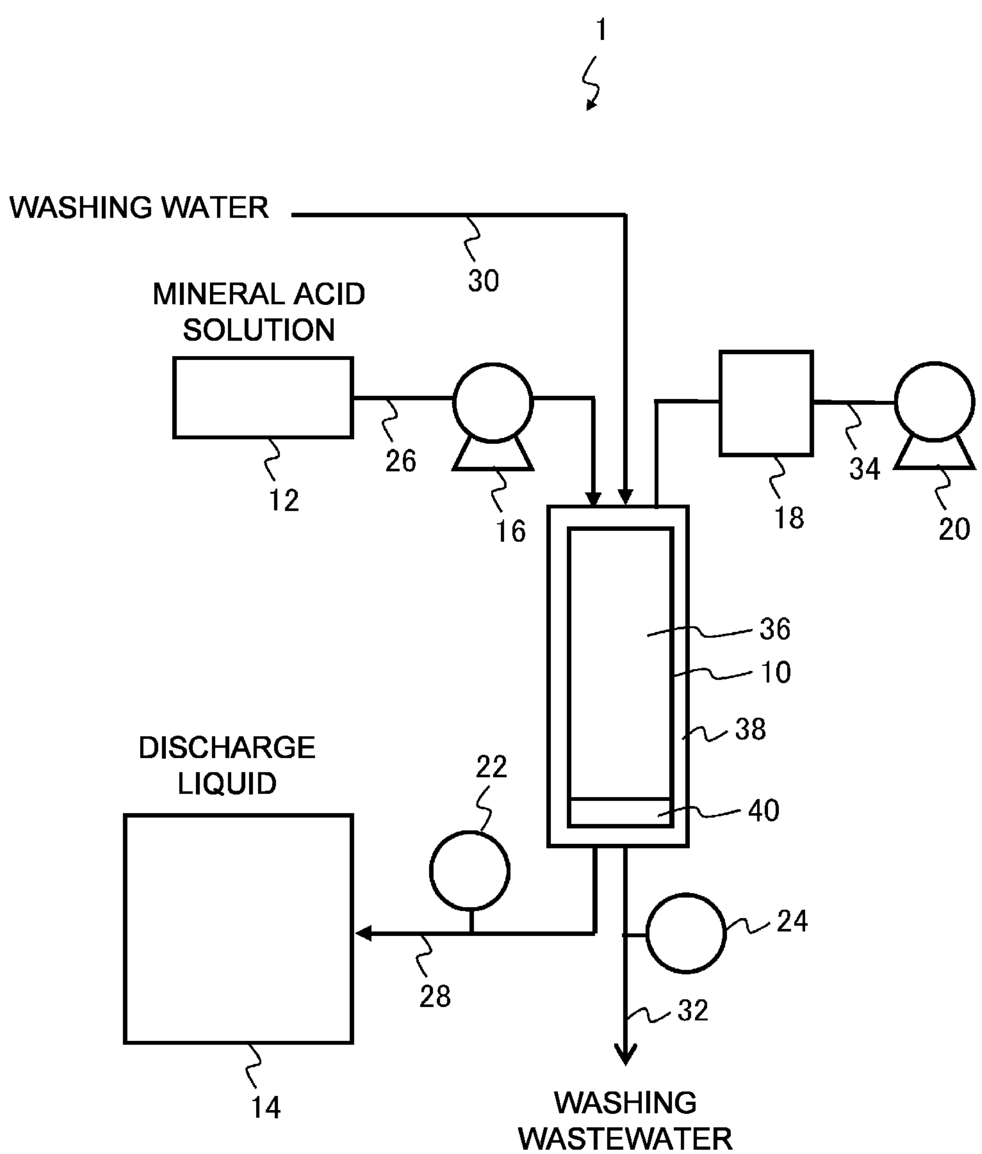
FIG. 1 is a schematic structural view illustrating one example of the dry ion exchange resin manufacturing device according to an embodiment of the present invention.

Embodiments of the present invention are described below. These embodiments are merely examples of implementing the present invention, and the present invention is not limited to these embodiments.

<Dry Ion Exchange Resin Manufacturing Method>

A dry ion exchange resin manufacturing method according to one embodiment of the present invention includes: a purifying step of obtaining a purified cation exchange resin by bringing a cation exchange resin that represents a purification target into contact with a mineral acid solution having a metal impurity content of not more than 1 mg/L and a concentration of at least 5% by weight to purify the cation exchange resin, and a drying step of drying the purified cation exchange resin under reduced pressure at 80° C. or lower until the moisture content is not more than 5% by weight. In the dry ion exchange resin manufacturing method of this embodiment, a total metal impurity elution amount eluted when hydrochloric acid with a concentration of 3% by weight is passed through the purified cation exchange resin obtained in the purifying step with a volume ratio of 25 times is not more than 5 μg/mL-R.

The inventors of the present invention investigated the purification of target cation exchange resins by bringing the resins into contact with a mineral acid solution, but if the mineral acid solution that is used in the contact itself contains metal impurities, then not only is it possible that the metal impurity content of the cation exchange resin may not be able to be reduced, but the metal impurities in the mineral acid solution may sometimes adsorb to the cation exchange resin, causing an increase in the metal impurity content of the resin. As a result, when the cation exchange resin that has been brough in contact with the mineral acid solution is subsequently used in the purification of a treatment target liquid such as a nonaqueous solvent, large amounts of metal substances and the like may actually be eluted into the treatment target liquid. In particular, among the various metals, sodium (Na), calcium (Ca), magnesium (Mg) and iron (Fe) tend to be present in cation exchange resins in larger amounts than other metals, and reduction of the amounts of these metals by contact with a mineral acid solution is problematic.

Accordingly, by bringing the cation exchange resin that represents the purification target into contact with a mineral acid solution having a metal impurity content of not more than 1 mg/L and a concentration of at least 5% by weight, the total metal impurity elution amount eluted when hydrochloric acid with a concentration of 3% by weight is passed through the obtained purified cation exchange resin with a volume ratio of 25 times is limited to not more than 5 μg/mL-R. Subsequently, this purified cation exchange resin is dried under reduced pressure at 80° C. or lower until the moisture content is not more than 5% by weight. By using this method, a dry ion exchange resin having a reduced moisture content and metal content can be obtained. In particular, satisfactory reductions can be achieved for moisture elution and metal elution from metal-removing cation exchange resins that can be used in the purification of high-grade hydrolyzable solvents in which the metal concentration following purification is not more than 1 ppb for each metal.

By bringing the purification target cation exchange resin into contact with a mineral acid solution having a low metal impurity content and a high acid concentration, conversion of the cation exchange resin into a metal ion form during contact with the mineral acid is suppressed, meaning the metal impurity content within the cation exchange resin can be reliably and effectively reduced, and a purified cation exchange resin with a low level of elutable metal impurities can be obtained. Specifically, the total metal impurity elution amount (and particularly the elution amounts of Na, Ca, Mg, and Fe and the like) eluted when hydrochloric acid with a concentration of 3% by weight is passed through the purified cation exchange resin with a volume ratio of 25 times can be limited to not more than 5 μg/mL-R. This purified cation exchange resin is then dried under reduced pressure at 80° C. or lower until the moisture content is not more than 5% by weight. By purifying a treatment target liquid such as a nonaqueous solvent using the dry ion exchange resin obtained in this manner, moisture elution can be suppressed, and a high purity treated liquid such as a nonaqueous solvent with a low metal impurity content can be obtained.

Drying under reduced pressure is a typical process, and can therefore be conducted inexpensively. In the drying under reduced pressure, a satisfactory amount of moisture can be removed even when heating at a temperature below the heat-resistant temperature of the cation exchange resin. In the case of chelating resins or weak cation exchange resins, the interactions between the functional groups and the bound water are weaker than those in strong cation exchange resins or strong anion exchange resins, and therefore drying by reduced pressure drying occurs more readily. On the other hand, strong anion exchange resins have particularly low heat resistance, and the functional groups tend to lose activity under the heat used during drying, whereas when strong cation exchange resins are heated at high temperatures, there is a possibility that functional groups may dissociate under the heat used during drying. In order to suppress the elution of moisture into the treatment target liquid such as a nonaqueous solvent, the moisture content is typically reduced to not more than 5% by weight, and may be reduced to not more than 2% by weight, or to 1% by weight or less. The chelating resins in Patent Document 3 contained moisture levels equivalent to 10 to 97% of the saturated moisture content, and so for a chelating resin with a saturated moisture content of about 60%, the moisture content is about 6%.

Examples of the cation exchange resin that represents the purification target include strong cation exchange resins, weak cation exchange resins, and chelating resins, and the target cation exchange resin may be at least one of a chelating resin and a weak cation exchange resin. Because chelating resins and weak cation exchange resins have a lower affinity for bound water than strong cation exchange resins and strong anion exchange resins, functional group dissociation caused by drying is less likely to occur, and elution from the resin is low.

Chelating resins are resins having functional groups that can form chelates (complexes) with metal ions. These functional groups may be any functional group capable of forming a chelate (complex) with a metal ion, and although there are no particular limitations, in the case of a chelating resin having cation exchange groups, examples of the functional groups include cation exchange groups such as aminomethylphosphonic acid groups, iminodiacetic acid groups and thiol groups, whereas in the case of chelating resin having anion exchange groups, examples include anion exchange groups such as polyamine groups and the like. In particular, polyamine groups are effective not only for removing metal ions, but also in the removal of impurities having aldehyde or ketone groups within the water or nonaqueous liquid, and therefore drying can simplify the pretreatment process when used in a nonaqueous liquid. From the viewpoint of selectivity relative to a plurality of metal types, the chelating resin preferably has aminomethylphosphonic acid groups or iminodiacetic acid groups as the chelating groups.

Examples of chelating resins that may be used include AmberSep IRC747UPS (chelating groups: aminomethylphosphonic acid groups), and AmberSep IRC748 (chelating groups: iminodiacetic acid groups) (both manufactured by DuPont de Nemours, Inc.) and the like. The chelating resin may, if necessary, be used following a pretreatment such as a regeneration treatment. Other resins that may be used include H-form chelating resins such as ORLITE (a registered trademark) DS-21 (product name, manufactured by Organo Corporation) (chelating groups: aminomethylphosphonic acid groups) and ORLITE (a registered trademark) DS-22 (product name, manufactured by Organo Corporation) (chelating groups: iminodiacetic acid groups).

AmberSep IRC747UPS and AmberSep IRC748 exist in the Na-form as their standard ionic form, but by bringing these materials onto contact with the mineral acid solution using the method described above, the ionic form can be changed from the Na-form to the H-form.

Examples of the functional groups of a weak cation exchange resin include carboxyl groups and the like.

Examples of weak cation exchange resins that may be used include AMBERLITE IRC76 (functional groups: carboxylic acid groups) (manufactured by DuPont de Nemours, Inc.), and AMBERLITE FPC3500 (functional groups: carboxylic acid groups) (manufactured by DuPont de Nemours, Inc.) and the like. The weak cation exchange resin may, if necessary, be used following a pretreatment such as a regeneration treatment.

Examples of the functional groups of a strong cation exchange resin include sulfonic acid groups and the like.

Examples of strong cation exchange resins that may be used include AMBERLITE IR124 (functional groups: sulfonic acid groups) (manufactured by DuPont de Nemours, Inc.), AMBERLITE 200CT (functional groups: sulfonic acid groups) (manufactured by DuPont de Nemours, Inc.), ORLITE (a registered trademark) DS-1 (product name, manufactured by Organo Corporation) (functional groups: sulfonic acid groups), and ORLITE (a registered trademark) DS-4 (product name, manufactured by Organo Corporation) (functional groups: sulfonic acid groups) and the like. The strong cation exchange resin may, if necessary, be used following a pretreatment such as a regeneration treatment.

The mineral acid solution used in purifying the cation exchange resin is a solution of an inorganic acid. Examples of the mineral acid include hydrochloric acid, sulfuric acid, and nitric acid and the like. Examples of the solvent that constitutes the solution include water such as pure water (specific resistance: approximately 10 MΩ·cm) and ultrapure water (specific resistance: approximately 18 MΩ·cm).

The metal impurity content of the mineral acid solution used in the purifying step is typically not more than 1 mg/L, should be as low as possible, and may be not more than 0.5 mg/L, or 0.2 mg/L or lower. If the metal impurity content of the mineral acid solution exceeds 1 mg/L, then a satisfactory metal impurity content reduction effect for the cation exchange resin cannot be achieved.

The concentration of the mineral acid in the mineral acid solution is at least 5% by weight, and may be 10% by weight or higher. If the concentration of the mineral acid in the mineral acid solution is less than 5% by weight, then a satisfactory metal impurity content reduction effect for the cation exchange resin cannot be achieved. The upper limit for the concentration of the mineral acid in the mineral acid solution is, for example, 37% by weight.

Here, the term "metal impurities" is deemed to include metals as well as metal impurity ions, with representative examples including sodium (Na), calcium (Ca), magnesium (Mg) and iron (Fe).

The amounts of sodium (Na), calcium (Ca), magnesium (Mg) and iron (Fe) in the mineral acid solution used in the purifying step are preferably as low as possible, and may each be not more than 200 μg/L, or 100 μg/L or lower. By bringing a mineral acid solution with these low metal impurity content amounts into contact with a cation exchange resin, the amounts of metal impurities such as sodium (Na), calcium (Ca), magnesium (Mg) and iron (Fe) within the cation exchange resin can be reduced reliably and effectively.

The temperature of the mineral acid solution brought into contact with the cation exchange resin in the purifying step is, for example, within a range from 0 to 40° C.

In the dry ion exchange resin manufacturing method according to an embodiment of the present invention, the purifying step described above is able to reduce the total metal impurity elution amount eluted when hydrochloric acid with a concentration of 3% by weight is passed through the purified cation exchange resin with a volume ratio of 25 times to a value of not more than 5 μg/mL-R. The total metal impurity elution amount is preferably as low as possible, and may be 1 μg/mL-R or lower. Ensuring this total metal impurity elution amount is not more than 5 μg/mL-R means that when the dry ion exchange resin obtained by subjecting this purified cation exchange resin to the drying step described above is used in purifying a treatment target liquid, the elution amount of these metal impurities from the cation exchange resin into the treated liquid can be reduced.

The eluted metal impurities may include at least one metal among sodium (Na), calcium (Ca), magnesium (Mg) and iron (Fe).

Following the purifying step, a washing step may be included in which the purified cation exchange resin that has undergone contact with the mineral acid solution is washed with a washing water such as pure water or ultrapure water. By washing the purified cation exchange resin with a washing water such as pure water or ultrapure water following the contact with the mineral acid solution, recontamination with metal impurities when the mineral acid solution is removed from the purified cation exchange resin can be suppressed.

Examples of the washing water that is brought into contact with the cation exchange resin in the washing step include pure water and ultrapure water and the like, and from the viewpoint of suppressing contamination following the purification, ultrapure water may be used.

The temperature of the washing liquid brought into contact with the cation exchange resin in the washing step is, for example, within a range from 0 to 30° C.

The drying temperature in the drying step is 80° C. or lower, and for example, may be within a range from 40 to 80° C. The drying time during the drying step may be any time required to achieve a moisture content of not more than 5% by weight. In the drying step, the absolute pressure during reduced-pressure drying may be −0.05 MPa or lower.

The total metal impurity elution amount eluted when hydrochloric acid with a concentration of 3% by weight is passed through the dry ion exchange resin with a volume ratio of 25 times is, for example, not more than 7 μg/mL-R, and may be 5 μg/mL-R or lower.

In terms of metal contamination during the drying under reduced pressure, because a portion (point) on the resin surface of the granules typically makes contact with the inside of the dryer, metal contamination derived from the device tends to be less than in the purifying step where the inside of the ion exchange resin column is filled with the mineral acid. In other words, metal contamination in the purifying step for the cation exchange resin conducted prior to the drying step has a greater effect than metal contamination caused by the drying, and therefore it is preferable to control the metal concentration of the purified cation exchange resin prior to drying.

The dry ion exchange resin may comprise a dry anion exchange resin combined with the dry chelating resin or dry cation exchange resin, and the combination may include an anion exchange resin with a moisture content of not more than 10% by weight, or an anion exchange resin with a moisture content of 6% by weight or less. In particular, dry weak anion exchange resins have superior heat resistance to strong anion exchange resins, and are therefore suited to dry resins, and by mixing a dry anion exchange resin with the dry chelating resin or dry cation exchange resin, acid elution from the dry chelating resin or dry cation exchange resin can be reduced while anionic form metals are captured.

Examples of the dry anion exchange resin mixed with the dry chelating resin or dry cation exchange resin include weak anion exchange resins. Examples of the anion exchange groups of the weak anion exchange resin include primary to tertiary amino groups, and glucamine groups that react selectively with boron. Chelating resins having polyamine groups are also weak anion exchange resins.

The dry ion exchange resin may be stored in a gas barrier container in which the interior portion that contacts the dry ion exchange resin is coated with a metal-free material, and for which the 24-hour water vapor permeability is not more than 8 g/m$^2$, and may be stored in a gas barrier container for which the 24-hour water vapor permeability is not more than 6 g/m$^2$. Examples of this type of gas barrier container include resin containers such as bags and metal containers such as aluminum bags in which the interior is laminated with Nylon or polyethylene or the like. Examples of water vapor permeability values include 15 g/m$^2$ for polyethylene, 0.1 g/m$^2$ for aluminum, and 6 g/m$^2$ for a low-barrier bag manufactured by AS ONE Corporation (see https://www.ady-jp.jp/category/1213991.html). The water vapor permeability can be measured using the method disclosed in JIS K7129 (to measure the amount of water vapor transmitted through a test piece per unit of time and per unit of surface area under prescribed temperature and humidity conditions). When the dry ion exchange resin is stored in a gas barrier container, the container may be purged with an inactive gas such as nitrogen prior to sealing.

Specific examples of the dry ion exchange resin manufacturing method described above are described below.

<Treatment Target Liquid Purifying Method>

A treatment target liquid purifying method according to an embodiment of the present invention is a method for purifying a treatment target liquid containing metal impurities and reducing the metal impurity content using the dry ion exchange resin obtained in the dry ion exchange resin manufacturing method described above.

The treatment target liquid that represents the purification target is a liquid that is to be purified by the ion exchange resin, and examples of this liquid include liquids such as manufacturing liquids, including liquid reagents, solvents such as dissolution solvents, and electronic materials and the like (including electronic materials themselves, as well as the raw materials for those electronic materials, and dissolution solvents used therewith) used in the manufacture of semiconductor integrated circuits (IC), flat panel displays (FPD) such as liquid crystal displays (LCD), electronic components such as image capture elements (CCD and CMOS), and various recording media such as CD-ROM and DVD-ROM (wherein these articles may be referred to jointly as "electronic industrial articles").

Examples of the liquid reagents include hydrogen peroxide, hydrochloric acid, sulfuric acid, hydrofluoric acid, phosphoric acid, acetic acid, citric acid, tartaric acid, oxalic acid, lactic acid, malonic acid, tetramethylammonium hydroxide, and ammonium fluoride aqueous solutions. Even in the purification of aqueous solutions, any fluctuation in water concentration in the aqueous solution being treated caused by the introduction of moisture from within the resin is preferably kept as low as possible.

Examples of the solvents include organic solvents such as acetone, 2-butanone, n-butyl acetate, ethanol, methanol, 2-propanol, toluene, xylene, propylene glycol methyl ether acetate, N-methyl-2-pyrrolidone, ethyl lactate, phenol compounds, dimethyl sulfoxide, tetrahydrofuran, γ-butyrolactone, polyethylene glycol monomethyl ether (PGME), and polyethylene glycol monomethyl ether acetate (PGMEA). A dry chelating resin purified using the dry ion exchange resin manufacturing method described above can be applied particularly favorably to nonaqueous solvents (nonaqueous media) such as polyethylene glycol monomethyl ether (PGME), polyethylene glycol monomethyl ether acetate (PGMEA), and mixtures thereof.

Examples of the electronic materials and the like include semiconductor related materials (such as resists, release agents, antireflective films, interlayer insulation film coating agents, and coating agents for buffer coating films), and materials for flat panel displays (FPD) (such as photoresists for liquid crystals, materials for color filters, alignment films, sealing materials, liquid crystal mixtures, polarizing plates, reflection plates, overcoat agents, and spacers).

Nonaqueous liquids in general may be used as the treatment target liquid, but a dry chelating resin purified using the dry ion exchange resin manufacturing method described above can be applied favorably when purifying organic solvents such as alcohols and ester-based or ketone-based solvents, and particularly ester-based organic solvents that are prone to hydrolysis upon contact with cation exchange resins, such as polyethylene glycol monomethyl ether (PGME), polyethylene glycol monomethyl ether acetate (PGMEA), and mixtures thereof. By using a dry chelating resin purified using the dry ion exchange resin manufacturing method described above, moisture elution from the dry chelating resin is low, and degradation of the hydrolyzable solvent such as polyethylene glycol monomethyl ether acetate (PGMEA) is almost non-existent.

Specific examples of the treatment target liquid purifying method using a dry ion exchange resin obtained in the dry ion exchange resin manufacturing method described above are described below.

<Examples of Dry Ion Exchange Resin Manufacturing Method and Manufacturing Device>

The dry ion exchange resin manufacturing method (purifying method) and manufacturing device (purifying device) according to embodiments of the present invention are described below using the drawings. FIG. 1 is a schematic structural view illustrating the overall structure of this dry ion exchange resin manufacturing device 1. The dry ion exchange resin manufacturing device 1 illustrated in FIG. 1 is a device that integrates a purifying device and a drying device.

The dry ion exchange resin manufacturing device 1 of FIG. 1 includes an ion exchange resin column 10 that functions as a purifying unit for obtaining a purified cation exchange resin by bringing a cation exchange resin that represents the purification target into contact with a mineral acid solution having a metal impurity content of not more than 1 mg/L and a concentration of at least 5% by weight to purify the cation exchange resin. The manufacturing device 1 may also include a mineral acid solution tank 12 for storing the mineral acid solution, and a discharge liquid tank 14 for storing a discharge liquid or the like.

In the manufacturing device 1, an outlet of the mineral acid solution tank 12 and a supply port located, for example, in the upper portion of the ion exchange resin column 10 are connected by a line 26 via a pump 16, and a discharge port located, for example, in the lower portion of the ion exchange resin column 10 and an inlet of the discharge liquid tank 14 are connected by a line 28. A pH meter 22 may be installed within the line 28 as a pH measuring unit for measuring the pH of the discharge liquid.

A line 30 is connected to a washing water supply port located, for example, in the upper portion of the ion exchange resin column 10, and a line 32 is connected to a washing wastewater discharge port located, for example, in the lower portion of the ion exchange resin column 10. A specific resistance meter (conductivity meter) 24 may be installed in the line 30 as a specific resistance or conductivity measurement unit for measuring the specific resistance or conductivity of the washing wastewater.

The ion exchange resin column 10 is constructed with a storage chamber, wherein the storage chamber is constructed, for example, from a resin material such as a fluororesin, and has a supply port for supplying the mineral acid solution into the inside of the chamber, and a discharge port for discharging the mineral acid solution externally. A cation exchange resin 36 that represents the purification target is packed and stored inside the storage chamber on top of a batten/mesh 40. The ion exchange resin column 10 is designed so that the mineral acid solution supplied through the supply port passes through the cation exchange resin 36 and is discharged externally through the discharge port, thus enabling purification of the cation exchange resin 36 to be conducted. Further, the ion exchange resin column 10 is also designed so that washing water supplied from the washing water supply port passes through the cation exchange resin 36 and is discharged externally from the washing wastewater discharge port, thus enabling washing of the cation exchange resin 36.

The manufacturing device 1 includes a heater 38 and a vacuum pump 20, which function as a drying unit for drying the purified cation exchange resin 36 under reduced pressure at 80° C. or lower until the moisture content is not more than 5% by weight. The heater 38 is installed so as to enable heating of the purified cation exchange resin 36 inside the ion exchange resin column 10, and for example, may be installed so as to cover at least a portion of the exterior of the ion exchange resin column 10 containing the purified cation exchange resin 36. The vacuum pump 20 is a pump for reducing the pressure inside the ion exchange resin column 10, wherein the suction side of the vacuum pump 20 and a suction port located, for example, in the upper portion of the ion exchange resin column 10 are connected via a line 34 via a moisture trap 18.

The mineral acid solution is stored inside the mineral acid solution tank 12. This mineral acid solution has a metal impurity content of not more than 1 mg/L and a concentration of at least 5% by weight.

In the manufacturing device 1, when the pump 16 is activated, the mineral acid solution inside the mineral acid solution tank 12 passes through the line 26 and is supplied toward the supply port of the ion exchange resin column 10. Depending on the flow rate of the mineral acid solution required for the purification, a plurality of pumps 16 may be provided within the line.

By supplying the mineral acid solution from the supply port, and passing the mineral acid solution through the cation exchange resin 36, for example, as a downward flow, and then discharging the mineral acid solution from the discharge port, the mineral acid solution is brought into contact with the purification target cation exchange resin 36 to conduct purification (the purifying step). The discharge liquid discharged from the discharge port passes through the line 28, and if necessary is stored in the discharge liquid tank 14.

The purified cation exchange resin 36 from this purifying treatment (metal impurity content reduction treatment) has a total metal impurity elution amount eluted when hydrochloric acid with a concentration of 3% by weight is passed through the purified cation exchange resin with a volume ratio of 25 times of not more than 5 μg/mL-R. As a result, a high-quality purified cation exchange resin with a low metal impurity content can be obtained.

In this embodiment, the purifying treatment (metal impurity content reduction treatment) is conducted by passing the mineral acid solution through the cation exchange resin 36 packed and stored inside the storage chamber of the ion exchange resin column 10 used in the manufacturing device 1, but the purifying treatment could also be conducted by dipping the cation exchange resin in a stored-state mineral acid solution.

In the purifying step, the pH meter 22 installed in the line 28 may be used to measure the pH of the discharge liquid. A determination as to whether or not to dispose of the discharge liquid as acid waste may be made on the basis of the pH of the discharge liquid measured by the pH meter 22.

Following passage of the mineral acid solution to reduce the metal impurity content, the cation exchange resin 36 may be washed with a washing water such as ultrapure water. For example, the washing water may be supplied through the line 30 toward the washing water supply port of the ion exchange resin column 10. By supplying the washing water from the washing water supply port, and passing the washing water through the cation exchange resin 36, for example, as a downward flow, and then discharging the washing water through the washing water discharge port, the washing water is brought into contact with the cation exchange resin 36 of the washing target to conduct washing (the washing step). In the washing step, the ion exchange resin column functions as the washing unit. The washing wastewater discharged from the washing water discharge port passes through the line 32 and is discharged. The washing liquid such as pure water or ultrapure water may be stored inside the mineral acid solution tank 12 or a separately provided tank, with the washing liquid then supplied from the tank to the interior of the ion exchange resin column 10 using a pump or the like.

As a result of this washing treatment, a high-quality purified ion exchange resin with an extremely low metal impurity content can be obtained.

In this embodiment, the washing treatment is conducted by passing the washing water through the cation exchange resin 36 packed and stored inside the storage chamber of the ion exchange resin column 10 used in the manufacturing device 1, but the washing treatment could also be conducted by dipping the cation exchange resin in a stored-state washing water.

In the washing step, the specific resistance meter (conductivity meter) 24 installed in the line 32 may be used to measure the specific resistance or conductivity of the washing wastewater. Washing with the washing water may be conducted until the specific resistance or conductivity of the washing wastewater measured by the specific resistance meter (conductivity meter) 24 falls to less than a prescribed value. Instead of the specific resistance value (conductivity), a TOC meter may be installed as a TOC measurement unit, the TOC measured, and washing with the washing water then conducted until the TOC value falls to less than a previously set prescribed value.

Following completion of the purifying step or the washing step, a drying step is conducted. For example, by activating the vacuum pump 20 to reduce the pressure inside the storage chamber of the ion exchange resin column 10 to a state of vacuum, and conducting heating with the heater 38, the purified cation exchange resin 36 can be dried under reduced pressure at 80° C. or lower until the moisture content is not more than 5% by weight (the drying step). This enables a dry ion exchange resin with reduced moisture content and metal content to be obtained.

Figure 2:
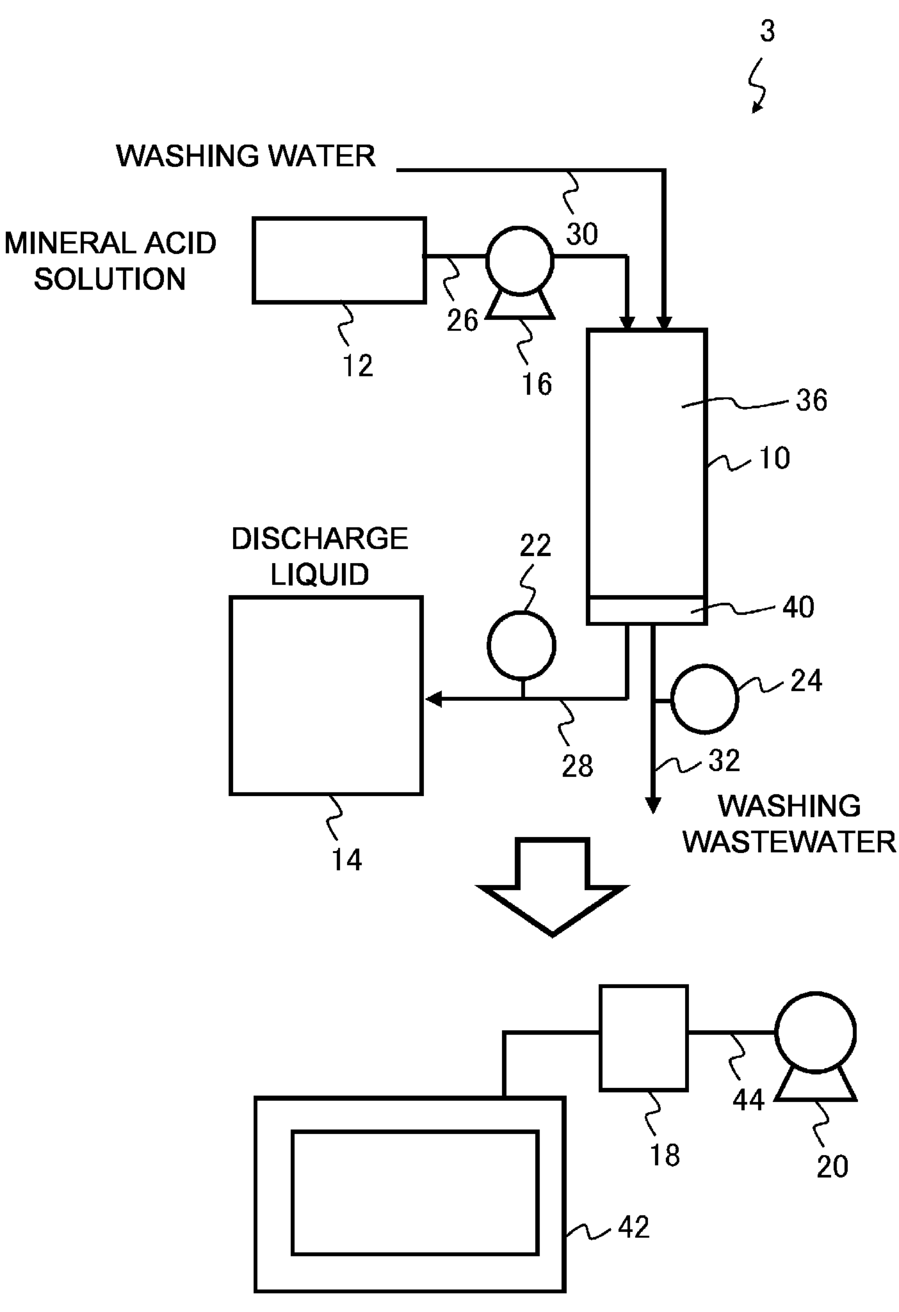
FIG. 2 is a schematic structural view illustrating another example of the dry ion exchange resin manufacturing device according to an embodiment of the present invention.

FIG. 2 illustrates another example of a dry ion exchange resin manufacturing device. The dry ion exchange resin manufacturing device 3 illustrated in FIG. 2 is a device in which the purifying device and the drying device are provided separately.

The dry ion exchange resin manufacturing device 3 of FIG. 2 includes an ion exchange resin column 10 that functions as a purifying unit for obtaining a purified cation exchange resin by bringing a cation exchange resin that represents the purification target into contact with a mineral acid solution having a metal impurity content of not more than 1 mg/L and a concentration of at least 5% by weight to purify the cation exchange resin. The manufacturing device 3 may also include a mineral acid solution tank 12 for storing the mineral acid solution, and a discharge liquid tank 14 for storing a discharge liquid or the like.

In the manufacturing device 3, an outlet of the mineral acid solution tank 12 and a supply port located, for example, in the upper portion of the ion exchange resin column 10 are connected by a line 26 via a pump 16, and a discharge port located, for example, in the lower portion of the ion exchange resin column 10 and an inlet of the discharge liquid tank 14 are connected by a line 28. A pH meter 22 may be installed within the line 28 as a pH measuring unit for measuring the pH of the discharge liquid.

A line 30 is connected to a washing water supply port located, for example, in the upper portion of the ion exchange resin column 10, and a line 32 is connected to a washing wastewater discharge port located, for example, in the lower portion of the ion exchange resin column 10. A specific resistance meter (conductivity meter) 24 may be installed in the line 30 as a specific resistance or conductivity measurement unit for measuring the specific resistance or conductivity of the washing wastewater.

The ion exchange resin column 10 is constructed with a storage chamber, and has a supply port for supplying the mineral acid solution into the inside of the chamber, and a discharge port for discharging the mineral acid solution externally. The cation exchange resin 36 that represents the purification target is packed and stored inside the storage chamber on top of a batten/mesh 40.

The manufacturing device 3 includes a drying oven 42 and a vacuum pump 20, which function as a drying unit for drying the purified cation exchange resin under reduced pressure at 80° C. or lower until the moisture content is not more than 5% by weight. The drying oven 42 is a device which can accommodate and heat the purified cation exchange resin extracted from the ion exchange resin column 10. The drying oven 42 may be a device in which, for example, the purified cation exchange resin extracted from the ion exchange resin column 10 is stored in a container, and the container is then heated from externally via a heating medium. The vacuum pump 20 is a pump for reducing the pressure inside the drying oven 42, wherein the suction side of the vacuum pump 20 and a suction port located, for example, in the upper portion of the drying oven 42 are connected via a line 44 via a moisture trap 18.

The mineral acid solution is stored inside the mineral acid solution tank 12. This mineral acid solution has a metal impurity content of not more than 1 mg/L and a concentration of at least 5% by weight.

In the manufacturing device 3, when the pump 16 is activated, the mineral acid solution inside the mineral acid solution tank 12 passes through the line 26 and is supplied toward the supply port of the ion exchange resin column 10. Depending on the flow rate of the mineral acid solution required for the purification, a plurality of pumps 16 may be provided within the line.

By supplying the mineral acid solution from the supply port, and passing the mineral acid solution through the cation exchange resin 36, for example, as a downward flow, and then discharging the mineral acid solution from the discharge port, the mineral acid solution is brought into contact with the purification target cation exchange resin 36 to conduct purification (the purifying step). The discharge liquid discharged from the discharge port passes through the line 28, and if necessary is stored in the discharge liquid tank 14.

The purified cation exchange resin 36 from this purifying treatment (metal impurity content reduction treatment) has a total metal impurity elution amount eluted when hydrochloric acid with a concentration of 3% by weight is passed through the purified cation exchange resin with a volume ratio of 25 times of not more than 5 μg/mL-R. As a result, a high-quality purified cation exchange resin with a low metal impurity content can be obtained.

In this embodiment, the purifying treatment (metal impurity content reduction treatment) is conducted by passing the mineral acid solution through the cation exchange resin 36 packed and stored inside the storage chamber of the ion exchange resin column 10 used in the manufacturing device 3, but the purifying treatment could also be conducted by dipping the cation exchange resin in a stored-state mineral acid solution.

In the purifying step, the pH meter 22 installed in the line 28 may be used to measure the pH of the discharge liquid. A determination as to whether or not to dispose of the discharge liquid as acid waste may be made on the basis of the pH of the discharge liquid measured by the pH meter 22.

Following passage of the mineral acid solution to reduce the metal impurity content, the cation exchange resin 36 may be washed with a washing water such as ultrapure water. For example, the washing water may be supplied through the line 30 toward the washing water supply port of the ion exchange resin column 10. By supplying the washing water from the washing water supply port, and passing the washing water through the cation exchange resin 36, for example, as a downward flow, and then discharging the washing water through the washing water discharge port, the washing water is brought into contact with the cation exchange resin 36 of the washing target to conduct washing (the washing step). In the washing step, the ion exchange resin column functions as the washing unit. The washing wastewater discharged from the washing water discharge port passes through the line 32 and is discharged. The washing liquid such as pure water or ultrapure water may be stored inside the mineral acid solution tank 12 or a separately provided tank, with the washing liquid then supplied from the tank to the interior of the ion exchange resin column 10 using a pump or the like.

As a result of this washing treatment, a high-quality purified ion exchange resin with an extremely low metal impurity content can be obtained.

In this embodiment, the washing treatment is conducted by passing the washing water through the cation exchange resin 36 packed and stored inside the storage chamber of the ion exchange resin column 10 used in the manufacturing device 3, but the washing treatment could also be conducted by dipping the cation exchange resin in a stored-state washing water.

In the washing step, the specific resistance meter (conductivity meter) 24 installed in the line 32 may be used to measure the specific resistance or conductivity of the washing wastewater. Washing with the washing water may be conducted until the specific resistance or conductivity of the washing wastewater measured by the specific resistance meter (conductivity meter) 24 falls to less than a prescribed value. Instead of the specific resistance value (conductivity), a TOC meter may be installed as a TOC measurement unit, the TOC measured, and washing with the washing water then conducted until the TOC value falls to less than a previously set prescribed value.

Following completion of the purifying step or the washing step, a drying step is conducted. For example, the purified cation exchange resin extracted from the ion exchange resin column 10 is stored inside the drying oven 42. The vacuum pump 20 may then be activated to reduce the pressure inside the drying oven 42 to a state of vacuum, and heating also conducted, enabling the purified cation exchange resin to be dried under reduced pressure at 80° C. or lower until the moisture content is not more than 5% by weight (the drying step). This enables a dry ion exchange resin with reduced moisture content and metal content to be obtained.

In the manufacturing devices 1 and 3, the liquid contact portions that make contact with the mineral acid solution (for example, the internal flow channels within the pump 16, the inner walls of the lines 26 and 28, the liquid contact portions such as the inner walls of the storage chamber of the ion exchange resin column 10, and the interiors of the mineral acid solution tank 12 and the discharge liquid tank 14) may be formed from or coated with a material that is inert relative to the mineral acid solution. As a result, the liquid contact portions are inert relative to the mineral acid solution, and effects such as metal impurity leaching from the liquid contact portions into the cation exchange resin can be reduced.

Examples of materials that are inert relative to the mineral acid solution and can be used for the liquid contact portions include fluororesins, polypropylene resins and polyethylene resins, and in terms of metal elution and the like, fluororesins are preferred. Examples of these fluororesins include PTFE (tetrafluoroethylene resins), PFA (tetrafluoroethylene-perfluoroalkoxyethylene copolymer resins), ETFE (tetrafluoroethylene-ethylene copolymer resins), FEP (tetrafluoroethylene-hexafluoropropylene copolymer resins), PVDF (vinylidene fluoride resins), ECTFE (ethylene-chlorotrifluoroethylene resins), PCTFEP (chlorotrifluoroethylene resins), and PVF (vinyl fluoride resins).

<Example of Treatment Target Liquid Purifying Method and Purifying Device>

Figure 3:
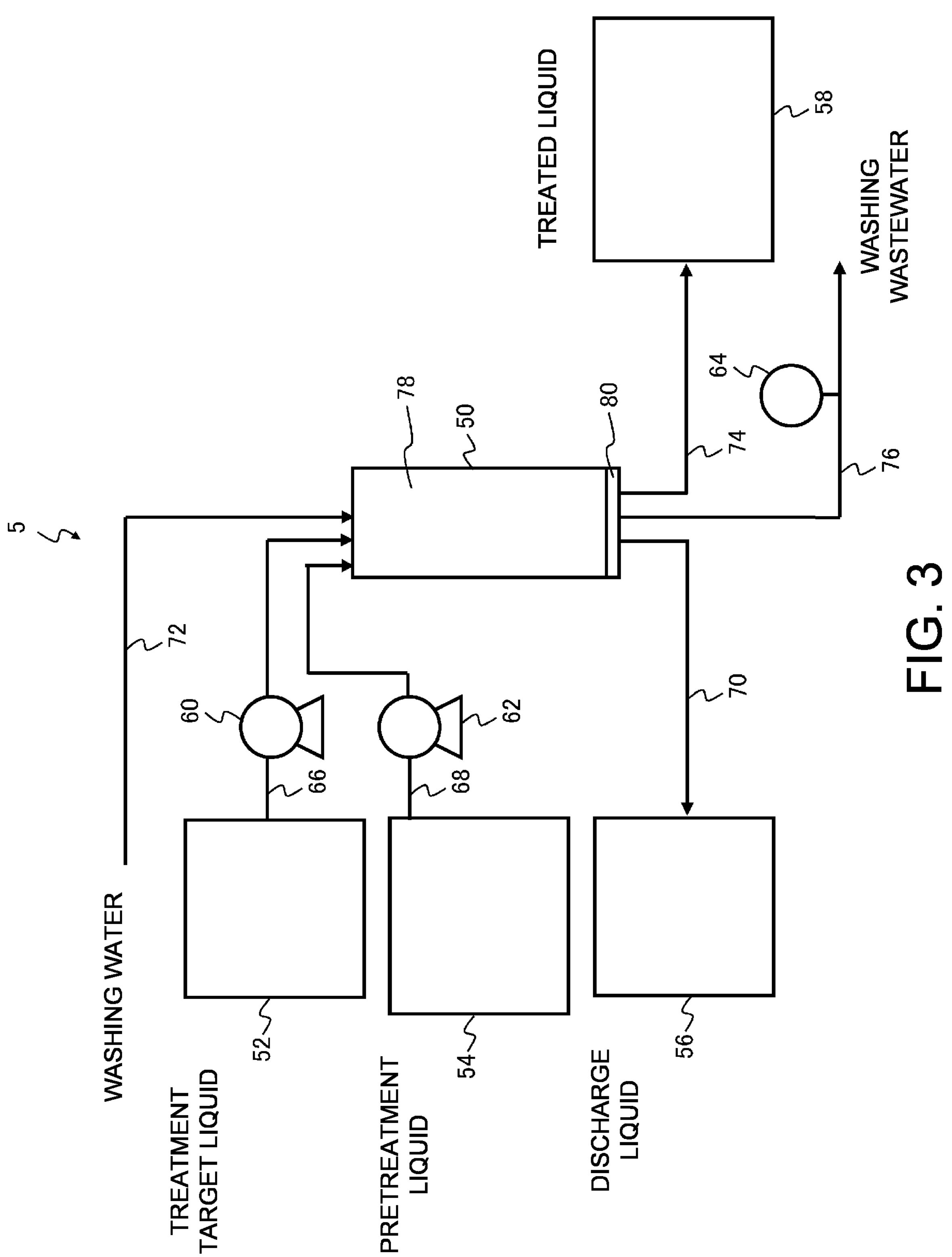
FIG. 3 is a schematic structural view illustrating one example of the treatment target liquid purifying device according to an embodiment of the present invention.

The treatment target liquid purifying method and purifying device according to embodiments of the present invention are described below using the drawings. FIG. 3 is a schematic structural diagram illustrating the overall structure of this treatment target liquid purifying device 5.

The treatment target liquid purifying device 5 of FIG. 3 includes an ion exchange resin column 50 that functions as a treatment target liquid purifying unit for bringing a treatment target liquid that acts as the purification target into contact with the dry ion exchange resin obtained in the manner described above in order to purify the treatment target liquid. The purifying device 5 may also include a treatment target liquid tank 52 for storing the treatment target liquid, and a treated liquid tank 58 for storing the treated liquid. The purifying device 5 may also include a pretreatment liquid tank 54 for storing a pretreatment liquid and a discharge liquid tank 56 for storing a discharge liquid.

In the purifying device 5, an outlet of the treatment target liquid tank 52 and a treatment target liquid supply port located, for example, in the upper portion of the ion exchange resin column 50 are connected by a line 66 via a pump 60, and a treated liquid discharge port located, for example, in the lower portion of the ion exchange resin column 50 and an inlet of the treated liquid tank 58 are connected by a line 74.

An outlet of the pretreatment liquid tank 54 and a pretreatment liquid supply port located, for example, in the upper portion of the ion exchange resin column 50 are connected by a line 68 via a pump 62, and a discharge liquid discharge port located, for example, in the lower portion of the ion exchange resin column 50 and an inlet of the discharge liquid tank 56 are connected by a line 70.

A line 72 is connected to a washing water supply port located, for example, in the upper portion of the ion exchange resin column 50, and a line 76 is connected to a washing wastewater discharge port located, for example, in the lower portion of the ion exchange resin column 50. A specific resistance meter (conductivity meter) 64 may be installed in the line 76 as a specific resistance or conductivity measurement unit for measuring the specific resistance or conductivity of the washing wastewater.

The treatment target liquid that represents the purification target is stored inside the treatment target liquid tank 52.

The ion exchange resin column 50 is constructed with a storage chamber, wherein the storage chamber is constructed, for example, from a resin material such as a fluororesin, and has a supply port for supplying the treatment target liquid into the inside of the chamber, and a discharge port for discharging the treated liquid externally. A dry ion exchange resin 78 such as that obtained in the manner described above is packed and stored inside the storage chamber on top of a batten/mesh 80. The ion exchange resin column 50 is designed so that the treatment target liquid supplied through the supply port passes through the dry ion exchange resin 78 and is discharged externally through the discharge port, thus enabling purification of the treatment target liquid to be conducted. The dry ion exchange resin 78 is an exchange resin that has been obtained using the dry ion exchange resin manufacturing method and manufacturing device described above, has a total metal impurity elution amount eluted when hydrochloric acid with a concentration of 3% by weight is passed through the exchange resin with a volume ratio of 25 times of not more than 5 μg/mL-R, and has already been subjected to a treatment to reduce the internal metal impurity content, meaning the metal impurity content is extremely low.

In the purifying device 5, when the pump 60 is activated, the treatment target liquid in the treatment target liquid tank 52 passes through the line 66 and is supplied toward the supply port of the ion exchange resin column 50. Depending on the flow rate of the treatment target liquid required for the purification, a plurality of pumps 60 may be provided within the line.

By supplying the treatment target liquid from the supply port, and passing the treatment target liquid through the dry ion exchange resin 78, for example, as a downward flow, and then discharging the treated liquid from the discharge port, the treatment target liquid that represents the purification target is brought into contact with the dry ion exchange resin 78 to conduct purification (the treatment target liquid purifying step). Alternatively, the supply port may be provided in the lower portion of the storage chamber of the ion exchange resin column 50, the inside of the storage chamber then filled with an upward flow of the treatment target liquid or a liquid of similar composition to the treatment target liquid, or a solvent that can be rapidly substituted using the treatment target liquid, and following the forcing of any air bubbles inside the resin out of the storage chamber, the treatment target liquid that represents the purification target is then purified by contact with the dry ion exchange resin 78 by passing the treatment target liquid through the exchange resin as a downward flow that is discharged from the discharge port. The treated liquid discharged from the discharge port passes through the line 74, and if necessary is stored in the treated liquid tank 58. Treated liquid for which the moisture content has not yet fallen to the target moisture level, or a mixed liquid of the pretreatment liquid described below and the treatment target liquid is passed through the line 70, and if necessary is stored in the discharge liquid tank 56.

As a result of this purifying treatment (metal impurity content reduction treatment), the metal impurity content in the treated liquid is reduced, for example, to not more than μg/L (for example, from amount of not more than 1,000 μg/L for each metal element). Further, the moisture content of the obtained treated liquid is, for example, 100 ppm or lower. Accordingly, a high-quality treated liquid with a low moisture content and metal impurity content can be obtained.

By constructing the ion exchange resin column using a dry ion exchange resin having a reduced moisture content and metal impurity content, obtained by bringing the exchange resin into contact with a mineral acid solution having an extremely low metal impurity content and then conducting drying under reduced pressure, the purification treatment (metal impurity content reduction treatment) of a treatment target liquid using this ion exchange resin column is able to reduce moisture elution and metal impurity elution into the treated liquid. As a result, a high-purity treated liquid with a low moisture content and metal impurity content can be obtained.

In this embodiment, the purifying treatment (metal impurity content reduction treatment) is conducted by passing the treatment target liquid through the dry ion exchange resin 78 packed and stored inside the storage chamber of the ion exchange resin column 50 used in the purifying device 5, but the purifying treatment could also be conducted by dipping the dry ion exchange resin in a stored-state treatment target liquid.

In those cases where a treatment target liquid having low affinity for water is used, a pretreatment liquid having a higher affinity for water than the treatment target liquid may be used. In the purifying device 5, when the pump 62 is activated, the pretreatment liquid in the pretreatment liquid tank 54 passes through the line 68 and is supplied toward the supply port of the ion exchange resin column 50.

By supplying the pretreatment liquid from the supply port, and passing the pretreatment liquid through the dry ion exchange resin 78, for example, as a downward flow, and then discharging the pretreatment liquid from the discharge port, the pretreatment liquid is brought into contact with the dry ion exchange resin 78 to conduct a pretreatment (the pretreatment step). The pretreatment discharge liquid discharged from the discharge port passes through the line 70, and if necessary is stored in the discharge liquid tank 56.

As a result of this pretreatment, the compatibility of the treatment target liquid and the dry ion exchange resin improves, and ionic impurities and more likely to diffuse into the interior of the ion exchange resin. Further, in those cases where a treatment target liquid having low affinity for water is used, by using a pretreatment liquid having a higher affinity for water than the treatment target liquid, the small amount of moisture retained inside the resin can be more easily substituted with the pretreatment liquid.

In those cases where the treatment target liquid is a nonaqueous liquid and the exchange resin is to be returned to the H-form, the dry ion exchange resin 78 dipped in the treatment target liquid is washed with a washing water such as ultrapure water, and a mineral acid or the like is then used to regenerate the H-form. For example, the washing water is passed through the line 72 and supplied toward the washing water supply port of the ion exchange resin column 50. By supplying the washing water from the washing water supply port, and passing the washing water through the dry ion exchange resin 78, for example, as a downward flow, and then discharging the washing water from the washing water discharge port, the washing water is brought into contact with the dry ion exchange resin 78 that represents the washing target to conduct washing (the washing step). In the washing step, the ion exchange resin column 50 functions as the washing unit. The washing wastewater discharged from the washing water discharge port is passed through the line 76 and discharged.

This washing treatment can regenerate the exchange resin back to its H-form. The exchange resin may also be used and discarded without conducting regeneration.

The liquid contact portions where the purifying device 5 makes contact with the treatment target liquid or the treated liquid (for example, the internal flow channels within the pump 60, the inner walls of the lines 66 and 74, the liquid contact portions such as the inner walls of the storage chamber of the ion exchange resin column 50, and the interiors of the treatment target liquid tank 52 and the treated liquid tank 58) may be formed from or coated with a material that is inert relative to the treatment target liquid. As a result, the liquid contact portions are inert relative to the treatment target liquid, and effects such as metal impurity leaching from the liquid contact portions into the treatment target liquid can be reduced.

Examples of materials that are inert relative to the treatment target liquid and can be used for the liquid contact portions include fluororesins, polypropylene resins and polyethylene resins, and in terms of metal elution and the like, fluororesins are preferred. Examples of these fluororesins include PTFE (tetrafluoroethylene resins), PFA (tetrafluoroethylene-perfluoroalkoxyethylene copolymer resins), ETFE (tetrafluoroethylene-ethylene copolymer resins), FEP (tetrafluoroethylene-hexafluoropropylene copolymer resins), PVDF (vinylidene fluoride resins), ECTFE (ethylene-chlorotrifluoroethylene resins), PCTFEP (chlorotrifluoroethylene resins), and PVF (vinyl fluoride resins).

If the purifying device 5 also has a filtration unit such as a filter for removing fine particle impurities contained in the treated liquid, in at least one location upstream or downstream from the ion exchange resin column 50, then the amounts of not only eluted metal impurities, but also fine particle impurities in the treated liquid can be reduced, and an even higher purity treated liquid can be obtained. The treated liquid that has been treated using the purifying device 5 may also be distilled, or a distilled liquid obtained by distillation may be further treated using the purifying device 5.

EXAMPLES

The present invention is described below in further detail using a series of examples and comparative examples, but the present invention is not limited to the following examples.

<Analysis Methods>

[Moisture Concentration Analysis]

Moisture content values (ppm by mass) within nonaqueous solvents mean values measured by the Karl Fischer method using a Karl Fischer volume method moisture meter (Aquacounter AQ-2200 manufactured by Hiranuma Co., Ltd.). The ppm value indicates a mass ratio of water relative to the target solution.

[Trace Metal Analysis]

The concentration of each metal was analyzed using an Agilent 8900 triple quadrupole ICP-MS (a brand name, manufactured by Agilent Technologies, Inc.).

[Acetic Acid Analysis]

The acetic acid concentration (ppm) within PGMEA was measured using a capillary electrophoresis system Agilent 7100 (a brand name, manufactured by Agilent Technologies, Inc.).

<Ion Exchange Resins>

The ion exchange resins used were as follows.

Figure 4:
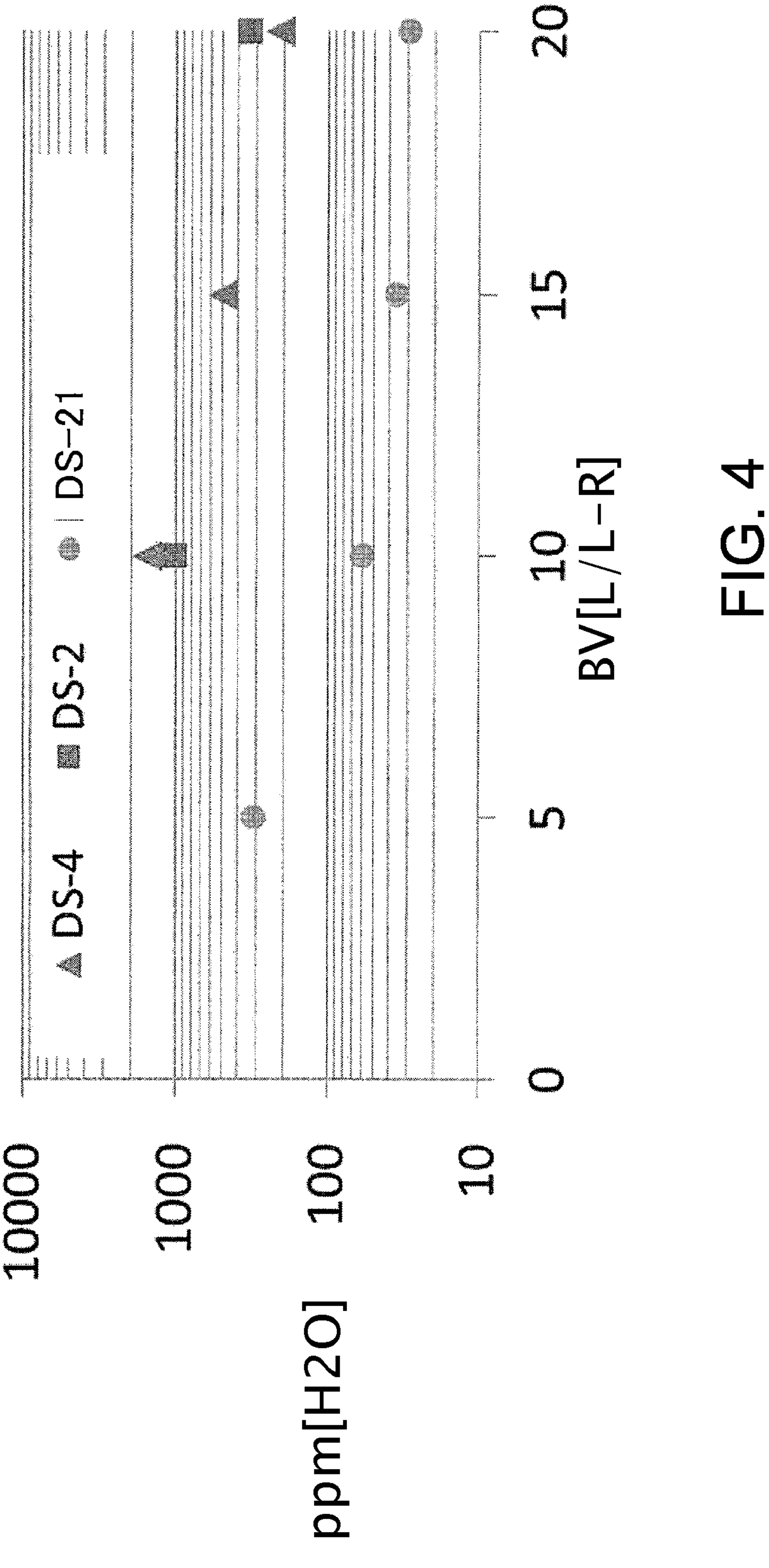
FIG. 4 is a graph illustrating the moisture concentration (ppm) in IPA at the column outlet relative to the bed volume (BV) (L/L-R) in Example 1.

DS-2: a gel-type strongly basic anion exchange resin, manufactured by Organo Corporation (ORLITE), resin material: styrene-divinylbenzene copolymer, type of ion exchange groups: quaternary amine groups DS-4: a macroporous-type strongly acidic cation exchange resin, manufactured by Organo Corporation (ORLITE), resin material: styrene-divinylbenzene copolymer, type of ion exchange groups: sulfonic acid groups DS-21: a macroporous-type chelating resin, manufactured by Organo Corporation (ORLITE), resin material: styrene-divinylbenzene copolymer, type of ion exchange groups (chelating groups): aminophosphoric acid groups DS-22: a macroporous-type chelating resin, manufactured by Organo Corporation (ORLITE), resin material: styrene-divinylbenzene copolymer, type of ion exchange groups (chelating groups): iminodiacetic acid groups IRA96SB: a macroporous-type weak anion exchange resin, manufactured by Organo Corporation (AMBERLITE (a registered trademark)), resin material: styrene-divinylbenzene copolymer, type of ion exchange groups: tertiary amino groups IRC76: a macroporous-type weak cation exchange resin, manufactured by Organo Corporation (AMBERLITE (a registered trademark) series), resin material: acrylic-based resin, type of ion exchange groups: carboxyl groups Example 1: Solvent Substitution Amounts of Strong Cation Exchange Resin, Strong Anion Exchange Resin, and Chelating Resin A series of PFA columns were packed with 50 mL of the wet-state chelating resin DS-21, strong cation exchange resin DS-4 and strong anion exchange resin DS-2 respectively, each column was supplied with isopropyl alcohol (IPA) with a moisture concentration of 30 ppm (TOKUSOH IPA, manufactured by Tokuyama Corporation, SE grade) at a rate of SV=5 $h^{-1}$, and supply was continued until the bed volume (BV) (L/L-R) reached 30. The moisture concentration (ppm) in the IPA at the column outlet was then analyzed to confirm the solvent substitution effect. The results are shown in Table 1 and FIG. 4.

TABLE 1

| BV | DS-2 | DS-4 | DS-21 |
|---|---|---|---|
| 5 | — | — | 310 |
| 10 | 1037 | 7248 | 59 |
| 15 | — | 1520 | 36 |
| 20 | 332 | 205 | 29 |

The strong cation exchange resin DS-4 and the strong anion exchange resin DS-2 exhibited moisture concentrations of 205 ppm and 332 ppm respectively at 20 BV, with the moisture concentrations not reducing to a value similar to that of the stock liquid. In contrast, in the case of the chelating resin DS-21 having weakly acidic cation groups, the moisture concentration had reduced to a similar level to that of the stock liquid at 15 BV. These results confirmed that the bound water bonded to the functional groups exhibited stronger interactions with the strong cation exchange groups and strong anion exchange groups.

Example 2: Solvent Substitution Amount of Chelating Resin and Dry Chelating Resin A resin obtained by purifying an H-form chelating resin by bringing the chelating resin DS-21 into contact with a 5% by weight hydrochloric acid solution having a metal concentration of not more than 1 mg/L as the mineral acid solution was used as the wet resin. A portion of this wet resin was dried under reduced pressure at 80° C. for at least 24 hours to obtain a dry chelating resin with a moisture content of 2% by weight.

Figure 5:
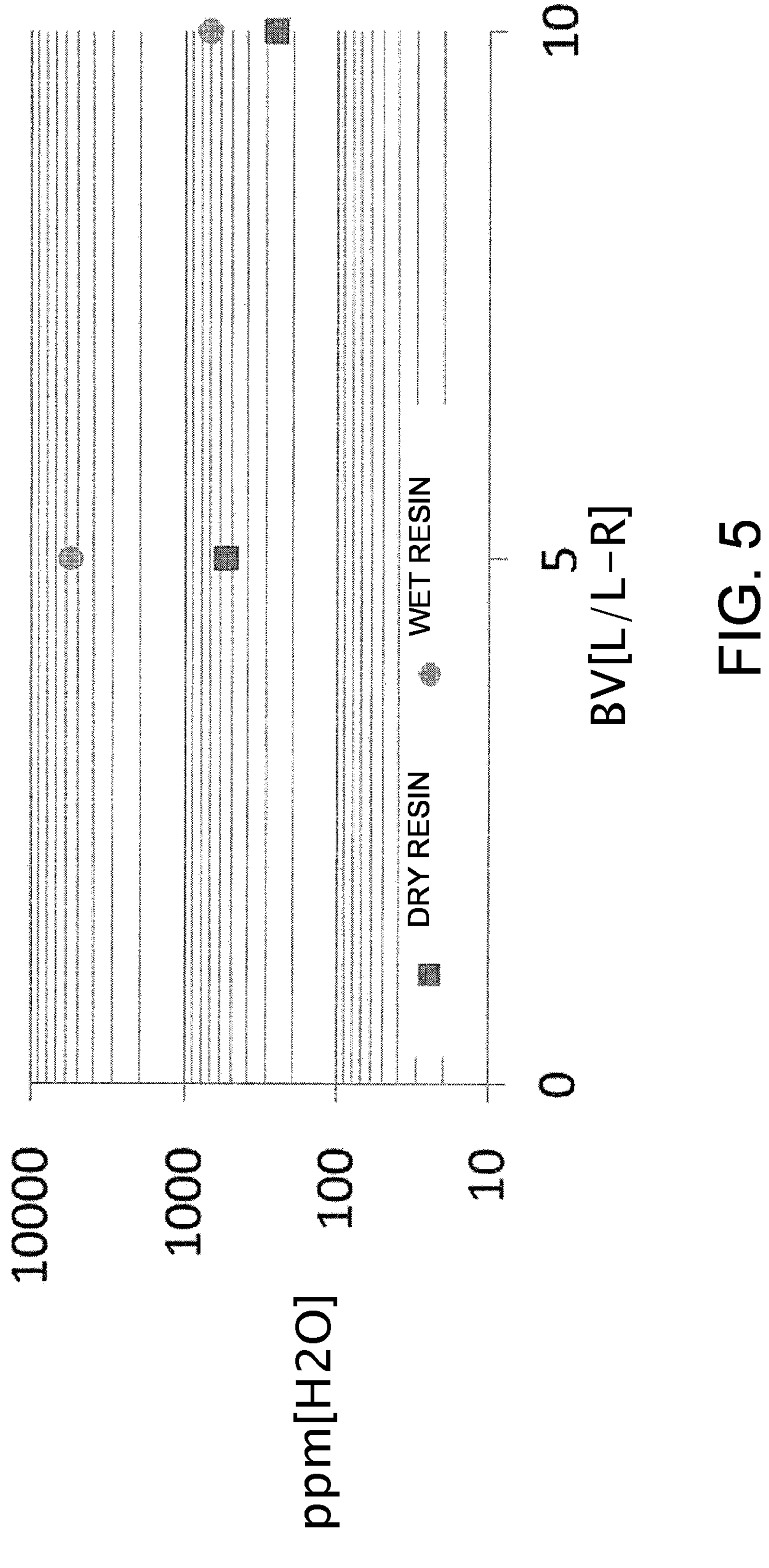
FIG. 5 is a graph illustrating the moisture concentration (ppm) in PGMEA at the column outlet relative to the bed volume (BV) (L/L-R) in Example 2.

The thus obtained wet resin and dry resin were each packed into a PFA column using the same method as Example 1, PGMEA with a moisture concentration of 50 ppm (manufactured by Tokyo Ohka Kogyo Co., Ltd.) was supplied to each column at a rate of SV=5 $h^{-1}$, and supply was continued until the bed volume (BV) (L/L-R) reached 10. The moisture concentration (ppm) in the PGMEA at the column outlet was then analyzed to confirm the solvent substitution effect. The results are shown in FIG. 5.

The results revealed that the largest difference in the moisture concentrations in the PGMEA was observed immediately after liquid passage began (5 BV), and confirmed that the drying resulted in a dramatic reduction in the resin eluent moisture concentration.

Example 3: Exchange Volumes Before and After Drying (Chelating Resins, Weak Cation Exchange Resin, Weak Anion Exchange Resin), Reduced Pressure Drying at 80° C.

Using the same method as Example 2, a wet resin and a dry resin was obtained for each of the H-form chelating resin DS-21, the H-form chelating resin DS-22, the H-form and weak cation exchange resin IRC76, and the weak anion exchange resin IRA96SB. The dry resin moisture content was 2% or less for the chelating resins and the weak cation exchange resin. The moisture content of the weak anion exchange resin was not more than 10%.

The exchange volumes of the thus obtained wet resins and dry resins were measured. The exchange volume was measured by placing the H-form chelating resin in an aqueous solution of sodium hydroxide, leaving the resin immersed overnight (18 hours) at 25° C., and then using titration to determine the amount of OH consumed compared with a sample not containing the chelating resin. The exchange volume for each dry resin was measured following immersion of the dry product in pure water overnight (18 hours) at 25° C. The free base form of IRA96SB was dried and titrated under the same conditions as above to calculate the exchange volume. The results are shown in Table 2.

TABLE 2

| Sample | Before drying (eq/L - wet resin) | After drying (eq/L - wet resin) |
|---|---|---|
| DS-21 | 2.6 | 2.6 |
| DS-22 | 1.7 | 1.7 |
| IRC76 | 4.0 | 4.0 |
| IRA96SB | 1.3 | 1.3 |

The results revealed that all of the resins maintained their functional groups under reduced pressure drying at 80° C., with almost no reduction in exchange volume observed as a result of heating.

Comparative Example 1: Exchange Volumes Before and After Drying (Weak Cation Exchange Resin, Weak Anion Exchange Resin), Reduced Pressure Drying at 180° C.

The same weak cation exchange resin IRC76 and weak anion exchange resin IRA96SB as Example 3 were dried at 180° C. for 18 hours, and the exchange volumes of the obtained dried products were evaluated in the same manner as Example 3. The results are shown in Table 3.

TABLE 3

| Sample | Before drying (eq/L - wet resin) | After drying (eq/L - wet resin) |
|---|---|---|
| IRC76 | 4.0 | 3.7 |
| IRA96SB | 1.3 | 1.0 |

The results confirmed that drying at a temperature exceeding the maximum operational temperature reduced the exchange volume of the sample resins.

Example 4: Metal Content of Clean Chelating Resin Before and After Drying

An H-form chelating resin was purified by contact with a 5% by weight hydrochloric acid solution having a metal concentration of not more than 1 mg/L. The metal impurity elution amounts eluted when hydrochloric acid with a concentration of 3% by weight was passed through the purified chelating resin with a volume ratio of 25 times was measured using an ICP-MS (inductively coupled plasma—mass spectrometer, manufactured by Agilent Technologies, Inc.), and the metal content values were analyzed. The metal content vales were analyzed for the wet product immediately following purification, and the dried product thereof. The dried product was obtained by placing the wet resin in a reduced pressure dryer, and conducting reduced pressure drying under a pressure of not more than 0 kPa at 80° C. for 24 hours to obtain a dry chelating resin with a moisture content of not more than 2% by weight. The results are shown in Table 4.

TABLE 4

| Metal content values (μg/mL - wet resin) | | |
|---|---|---|
| Resin | DS-21 wet | DS-21 dry |
| Na | 0.06 | 0.10 |
| Mg | 0.03 | 0.03 |
| Al | <0.01 | 0.02 |
| K | 0.02 | 0.06 |
| Ca | 0.36 | 0.42 |
| Fe | <0.01 | 0.03 |
| Ni | <0.01 | 0.03 |
| Zn | 0.05 | 0.08 |

The results of analyzing the metal content values revealed no dramatic increase in any metal following drying. Accordingly, it can be stated that the dry chelating resins obtained in these tests were dry chelating resins with a high degree of cleanliness.

Example 5, Comparative Example 2: Purification of Nonaqueous Solvent Using Dry Chelating Resin PFA resin columns (inner diameter: 16 mm, height: 30 mm) were packed with 36 mL of the wet chelating resin (Comparative Example 2) and the dry chelating resin (Example 5) respectively described in Example 3. The dry weight of the dry chelating resin that generated 36 mL when immersed in PGMEA was measured in advance, that dry resin was then converted to a slurry using 1 BV of PGMEA (brand name: PM Thinner, manufactured by Tokyo Ohka Kogyo Co., Ltd.), and the slurry was then packed into the PFA column.

A PGMEA simulation liquid that had been prepared in advance was then brought into contact from the top of the column. The simulation liquid was prepared by adding ICP-MS standards (manufactured by SPEX Ltd.) to PGMEA (brand name: PM Thinner, manufactured by Tokyo Ohka Kogyo Co., Ltd.). Subsequently, the prepared simulation liquid was brought into contact with the resin at SVS, and after one hour (BV5), the moisture concentration and metal concentrations in the PGMEA obtained at the column outlet were analyzed. The thus obtained results were compared with the moisture concentration and metal concentration values in the PGMEA prior to purification (the stock liquid), and the moisture elution concentration and metal removal amounts were compared. The results are shown in Table 5.

TABLE 5

| | Wet Comparative Example 2 | Dry Example 1 | Simulation Liquid |
|---|---|---|---|
| | Metal concentration (ng/L) | | |
| Na | <20 | <20 | 73 |
| Mg | <20 | <20 | 54 |
| Al | <20 | <20 | 55 |
| Ca | <20 | <20 | 70 |
| Fe | <20 | <20 | 67 |
| Ni | <20 | <20 | 61 |
| Cu | <20 | <20 | 90 |
| Zn | <20 | <20 | 32 |
| Moisture (%) | 0.6 | 0.05 | 0.041 |

When the dry chelating resin was used (Example 5), the moisture elution concentration was lower.

Example 6: Moisture and Acetic Acid Concentration in PGMEA Solution

In order to confirm the effect of moisture eluted from the resin on the hydrolyzable solvent PGMEA, PGMEA (brand name: PM Thinner, manufactured by Tokyo Ohka Kogyo Co., Ltd.) was brought into contact with the H-form chelating resin DS-22 that represents the wet chelating resin prepared using the method described in Example 2 to obtain a resin treated liquid. A PGMEA containing 0.6% by weight of moisture (Comparative Example 3) was obtained from the initial stage of liquid passage, and then liquid passage was continued, the moisture elution amount fell, and a resin treated PGMEA containing 0.05% by weight of moisture was obtained. These resin treated liquids were stored for 14 days at room temperature (20±5° C.), and the acetic acid concentration following storage was measured. The results are shown in Table 6.

TABLE 6

| Acetic acid (mg/L) | Comparative Example 3 Moisture concentration 0.6% | Example 6 0.05% | PGMEA |
|---|---|---|---|
| After 14 days | 20 | 17 | 17 |

The results confirmed that a lower moisture concentration leads to a lower amount of generated acetic acid, and that using a dry chelating resin has the effect of suppressing any increase in the acetic acid concentration in PGMEA, particularly during storage, caused by resin eluted moisture.

Examples 7 and 8: Moisture Content and Metal Elution Amounts (Gas Barrier Bag, PE Bag The same method as Example 2 was used to obtain an H-form dried resin of the chelating resin DS-21. The moisture content was 1% by weight. Using a LAMIZIP LZ-10 (manufactured by Seisan Nipponsha Ltd.) having an inner material composed of a Nylon/polyethylene laminate (water vapor permeability: 3 to 5 $g/m^2 \cdot 24$ hr) as a gas barrier container, 30 g of the obtained dry resin was packed in the gas barrier container, and following sealing of the container with a heat sealer, the container was placed inside an aluminum bag at a humidity of at least 90% and then left to stand in a 40° C. constant-temperature chamber for 10 days. A wet towel was placed inside the aluminum bag, and in order to ensure that the towel and the resin-filled container did not make contact, the resin-filled container was placed on top of a stand positioned on top of the towel. In Example 8, 30 g of the obtained dry resin was packed into a UNI-PACK (manufactured by Seisan Nipponsha Ltd.) composed of a polyethylene (PE) material, and the bag was then placed inside an aluminum bag and stored under the same conditions as described above. The resin moisture content was measured after the 10 days of storage. The resin was then heated overnight at 105° C., and the mass values before and after heating were used to calculate the moisture content. The results are shown in Table 7. Although the accurate water vapor permeability of the PE container described in Example 8 is unclear, the water vapor permeability of PE has been reported in the literature as being 15.2 $g/m^2 \cdot 24$ hr (https://www.ady-jp.jp/category/1213991.html).

Comparative Example 4

In Comparative Example 4, the same method as Example 2 was used to obtain an H-form dried resin of the chelating resin DS-21. The moisture content was 1% by weight. Next, 30 g of the dry resin was placed in a Petri dish, was then left to stand in an aluminum bag at a humidity of at least 90% in the same manner as Examples 7 and 8, and the aluminum bag was then sealed and left to stand in a 40° C. constant-temperature chamber for 10 days. The resin moisture content was measured after the 10 days of storage. The resin was then heated overnight at 105° C., and the mass values before and after heating were used to calculate the moisture content. The results are shown in Table 7.

TABLE 7

| Moisture content (% by weight) | Example 7 | Example 8 | Comparative Example 4 |
|---|---|---|---|
| after 10 days | 4% | 5% | 54% |

When storage was conducted under higher temperature and higher humidity conditions than a typical test chamber, Example 7 exhibited a smaller increase in moisture content than Example 8, indicating the effect of using a gas barrier container. In contrast, in Comparative Example 4 in which storage was conducted under high humidity conditions without using a gas barrier container, the moisture content increased dramatically.

The above results confirmed that a dry ion exchange resin with a reduced moisture content and metal content was able to be obtained. Further, by purifying a nonaqueous solvent that represents a treatment target liquid using the dry ion exchange resins obtained in the examples, high-quality treated liquids having a low moisture content and low metal impurity content were able to be obtained.

REFERENCE SIGNS LIST

1, 3: Manufacturing device
5: Purifying device
10, 50: Ion exchange resin column
12: Mineral acid solution tank
14, 56: Discharge liquid tank
16, 60, 62: Pump
18: Moisture trap
20: Vacuum pump
22: pH meter
24, 64: Specific resistance meter (conductivity meter)
26, 28, 30, 32, 34, 44, 66, 68, 70, 72, 74, 76: Line
36: Cation exchange resin
38: Heater
40, 80: Batten/mesh
42: Drying oven
52: Treatment target liquid tank
54: Pretreatment liquid tank
58: Treated liquid tank
78: Dry ion exchange resin

The invention claimed is:

1. A dry ion exchange resin manufacturing method comprising:

obtaining a purified cation exchange resin by bringing a cation exchange resin that represents a purification target into contact with a mineral acid solution having a metal impurity content of not more than 1 mg/L and a concentration of at least 5% by weight to purify the cation exchange resin, wherein a total metal impurity elution amount eluted when hydrochloric acid with a concentration of 3% by weight is passed through the purified cation exchange resin with a volume ratio of 25 times is not more than 5 μg/mL-R; and drying the purified cation exchange resin under reduced pressure at 80° C. or lower until a moisture content is not more than 5% by weight to obtain a dry cation exchange resin, wherein the cation exchange resin is at least one of a H-form chelating resin and a weak cation exchange resin, wherein the chelating resin has aminomethylphosphonic acid groups or iminodiacetic acid groups as chelating groups, and wherein the dry cation exchange resin is used for purification of a hydrolyzable solvent in which a metal concentration following purification is not more than 1 ppb for each metal.

2. The dry ion exchange resin manufacturing method according to claim 1, wherein amounts of sodium (Na), calcium (Ca), magnesium (Mg) and iron (Fe) in the mineral acid solution used during the obtaining of the purified cation exchange resin are each not more than 200 μg/L.

3. The dry ion exchange resin manufacturing method according to claim 1, further comprising mixing a dry cation exchange resin obtained during the drying of the purified cation exchange resin with an anion exchange resin having a moisture content of not more than 10% by weight.

4. A dry ion exchange resin manufacturing method, wherein the dry ion exchange resin obtained in the dry ion exchange resin manufacturing method according to claim 1 is stored in a container in which an interior portion that contacts the dry ion exchange resin is coated with a metal-free material, and for which a 24-hour water vapor permeability is not more than 8 $g/m^2$.

5. A treatment target liquid purifying method for purifying a treatment target liquid having ionic impurities and a moisture concentration of not more than 1% by weight using the dry ion exchange resin obtained in the dry ion exchange resin manufacturing method according to claim 1.

* * * * *